(12) United States Patent
Fan et al.

(10) Patent No.: US 10,955,382 B2
(45) Date of Patent: Mar. 23, 2021

(54) EXPERIMENTAL DEVICE FOR STUDYING THE PROPAGATION CHARACTERISTICS OF STRESS WAVE IN JOINTED ROCK MASS AT HIGH TEMPERATURE

(71) Applicant: BEIJING UNIVERSITY OF TECHNOLOGY, Beijing (CN)

(72) Inventors: Lifeng Fan, Beijing (CN); Lijuan Wang, Beijing (CN); Chao Xu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 16/626,295

(22) PCT Filed: Sep. 6, 2019

(86) PCT No.: PCT/CN2019/104605
§ 371 (c)(1),
(2) Date: Dec. 23, 2019

(87) PCT Pub. No.: WO2020/098351
PCT Pub. Date: May 22, 2020

(65) Prior Publication Data
US 2020/0386715 A1 Dec. 10, 2020

(30) Foreign Application Priority Data
Nov. 12, 2018 (CN) .......................... 201811341363.6

(51) Int. Cl.
*G01N 29/07* (2006.01)
*G01N 29/04* (2006.01)
*G01N 29/22* (2006.01)

(52) U.S. Cl.
CPC ............ *G01N 29/07* (2013.01); *G01N 29/045* (2013.01); *G01N 29/228* (2013.01); *G01N 2291/0232* (2013.01); *G01N 2291/0421* (2013.01)

(58) Field of Classification Search
CPC ........ G01L 1/248; G01L 1/241; G01N 29/045; G01N 2203/001; G01N 3/317;
(Continued)

(56) References Cited

U.S. PATENT DOCUMENTS 6,023,976 A * 2/2000 Borza ...................... F41H 11/12
73/598
6,343,502 B1 * 2/2002 Subhash ................... G01N 3/48
73/81

(Continued)

FOREIGN PATENT DOCUMENTS

CN 104569304 A 4/2015
CN 204594788 U 8/2015
(Continued)

OTHER PUBLICATIONS

Hong etal, Experimental Study on Stress Wave Energy Attenuation Across Rough Joints, 10th Asian Rock Mechanics Symposium (ARMS10), Singapore—The 2018 ISRM International Symposium (Year: 2018).*

(Continued)

*Primary Examiner* — David L Singer
(74) *Attorney, Agent, or Firm* — J.C. Patents

(57) ABSTRACT

An experimental device for studying the propagation characteristics of stress wave in jointed rock mass at high temperatures. The device includes a launch system, a loading system, a measuring system and a heating device. The heating device can be heated in sections to meet complicated test requirements. The measuring system includes two sets (Continued)

of measuring devices to ensure test accuracy. One measuring device uses a strain gauge to measure the local displacement of rock, thus obtaining the change of wave velocity; this method can be used when sample temperature is low. The other device adopts digital image processing technology. The experimental device can control the initial wave form and initial wave velocity, which can better meet the test requirements. The position of the sample can be fine-tuned to avoid the impact of errors left by rock processing on the test results.

7 Claims, 3 Drawing Sheets

(58) Field of Classification Search
CPC .......... G01N 2203/0226; G01N 3/068; G01N 29/07; G01N 29/228; G01N 2291/0421; G01N 2291/0232
See application file for complete search history.

(56) References Cited

U.S. PATENT DOCUMENTS

| 7,024,922 | B1* | 4/2006 | Nakagawa | G01N 3/30 73/12.01 |
| 7,412,870 | B2* | 8/2008 | Brankov | G01N 3/303 73/12.11 |
| 2003/0074949 | A1* | 4/2003 | Albertini | G01N 3/307 73/12.08 |
| 2015/0369676 | A1 | 12/2015 | Kia et al. | |
| 2017/0342827 | A1 | 11/2017 | Al-Qahtani | |
| 2018/0017475 | A1* | 1/2018 | Sweet | G01N 3/04 |
| 2020/0011777 | A1* | 1/2020 | Cheng | G06Q 50/02 |

FOREIGN PATENT DOCUMENTS

| CN | 106093194 A | | 11/2016 | |
| CN | 106248475 A | * | 12/2016 | ............... G01N 3/02 |
| CN | 106770658 A | | 5/2017 | |
| CN | 105319124 B | * | 2/2018 | ............... G01N 3/02 |
| CN | 107796711 A | * | 3/2018 | ............... G01N 3/24 |
| CN | 108361023 A | * | 8/2018 | ............... G01N 3/30 |
| CN | 108709931 A | | 10/2018 | |
| CN | 109283249 A | | 1/2019 | |
| CN | 109342564 A | | 2/2019 | |
| KR | 101727405 B1 | * | 5/2017 | ............... G01N 3/04 |

OTHER PUBLICATIONS

Ju et al, Study on stress wave propagation in fractured rocks with fractal joint surfaces, International Journal of Solids and Structures 44 (2007) 4256-4271 (Year: 2006).*
Machine Translation CN105319124B (Year: 2020).*
Machine Translation CN1106248475A (Year: 2020).*
Machine Translation CN107796711A (Year: 2020).*
Machine Translation KR101727405B1 (Year: 2020).*
The Chinese International Search Report of corresponding International application No. PCT/CN2019/104605, dated Oct. 30, 2019.
The Chinese First Examination Report of corresponding Chinese application No. 201811341363.6, dated Dec. 6, 2019.

* cited by examiner

EXPERIMENTAL DEVICE FOR STUDYING THE PROPAGATION CHARACTERISTICS OF STRESS WAVE IN JOINTED ROCK MASS AT HIGH TEMPERATURE

TECHNICAL FIELD

The present disclosure relates to an experimental device for studying the propagation characteristics of stress wave in jointed rock mass at high temperature.

BACKGROUND ART

In nature, rock mass usually has defects such as joints, faults and weak interlayers. In practical engineering, jointed rock mass often has the characteristics of heterogeneity, anisotropy and nonlinearity. With the continuous development of economic construction, the scale of underground geotechnical engineering is becoming larger and larger, and the rock mechanics problems involved are becoming more and more complicated, which puts forward higher requirements for rock mechanics research. In the construction and use of underground geotechnical engineering, it is inevitable to encounter blasting, mining, earthquake, landslide, rock burst and other underground engineering problems. These underground engineering problems are closely related to the propagation characteristics of stress waves in jointed rock mass, so it is of great engineering significance to study the propagation characteristics of stress waves in jointed rock mass for prevention and control of underground rock engineering problems. At present, theoretical research shows that when the stress wave propagates in underground jointed rock mass, the structural plane such as jointed rock mass will seriously affect propagation law of the wave that resulting in the attenuation of amplitude, the delay of high-frequency filtering signal and the slowing down of wave propagation speed. It hinders the propagation of stress wave and intensifies the attenuation of stress wave energy. However, the existing research on stress wave propagation characteristics in rock mass is mainly focused on numerical research and normal temperature rock mass, while the research on stress wave propagation characteristics in rock mass and stress wave propagation under high temperature conditions is less.

SUMMARY

In order to test the propagation characteristics of elastic longitudinal waves in rock mass at high temperature, the present disclosure provides an experimental device for studying the propagation characteristics of elastic longitudinal waves in rock mass at high temperature, the purpose of which is to accurately measure the propagation characteristics of elastic longitudinal waves at joint positions at different temperatures.

The technical scheme adopted by the present disclosure is: an experimental device for studying the propagation characteristics of elastic longitudinal waves at joint positions comprising: a launch system, a loading system, a measuring system and a heating device.

Wherein, the launch system includes: a base, a bullet, a transmitting chamber, an infrared speedometer and a drive coil. An energy storage power supply, a switch and a dynamic system are connected to the drive coil. Wherein a tube of the transmitting chamber is made of a high-strength insulating material, and the bullet is composed of an armature and a metal projectile body. The dynamic system uses a magnetic wave generated by alternating current to drive the bullet, wherein the initial velocity of the bullet can be changed by changing the discharge voltage, so as to obtain the propagation characteristics of elastic longitudinal waves with different initial velocities in jointed rock mass. At the same time, the propagation characteristics of elastic waves with different initial waveforms in jointed rock mass can be obtained by adjusting the shape of bullets.

The loading system of the present disclosure is mainly used to ensure that the center line of two rock samples and the bullet is on a horizontal line, and the position of rock samples can be adjusted by fine-tuning the pulley position of the loading system, so as to ensure that the rock samples are located on the same horizontal surface.

The heating device of the present disclosure adopts a segmented heating method, and each stone rod adopts a three-stage heating process. This multi-stage heating method can effectively heat the heating area and at the same time heat the stone rods in stages, which can meet complicated test requirements.

The measuring system of the present disclosure mainly comprises two measuring devices. One measuring device uses a strain gauge to measure the local displacement of rock, thus obtaining the change of wave velocity. This method can be used when sample temperature is low. The other device adopts digital image processing technology (DIC technology). When the temperature is higher than 300 Celsius degrees, the strain gauge method cannot adequately meet the test requirements, while DIC technology can better solve this problem. At low temperatures, two measurements can be compared to ensure accuracy of the test.

The beneficial effects of the invention are: the launch system is easy to operate and can control the initial wave form and initial wave velocity, which can better meet the test requirements; the position of sample can be fine-tuned to avoid the impact of errors left by rock processing on test results; the heating device can be heated in sections to meet complicated test requirements; and two sets of measuring system are adopted to ensure the test accuracy.

THE APPENDED DRAWINGS

Wherein: 1. base; 2. rock sample; 3. launch system; 4. supporter; 5. bullet; 6 transmitting chamber; 7. drive coil; 8. support rod; 9. fixing bolt; 10. pulley; 11. screw; 12. outer pulley; 13. bearing; 14. inner pulley; 15. high-speed camera; 16. strain gauge; 17. metal shell; 18. heating wire; 19. connecting device; 20. asbestos insulation layer; and 21. asbestos sealing plate.

PREFERRED EMBODIMENT

Figure 1:
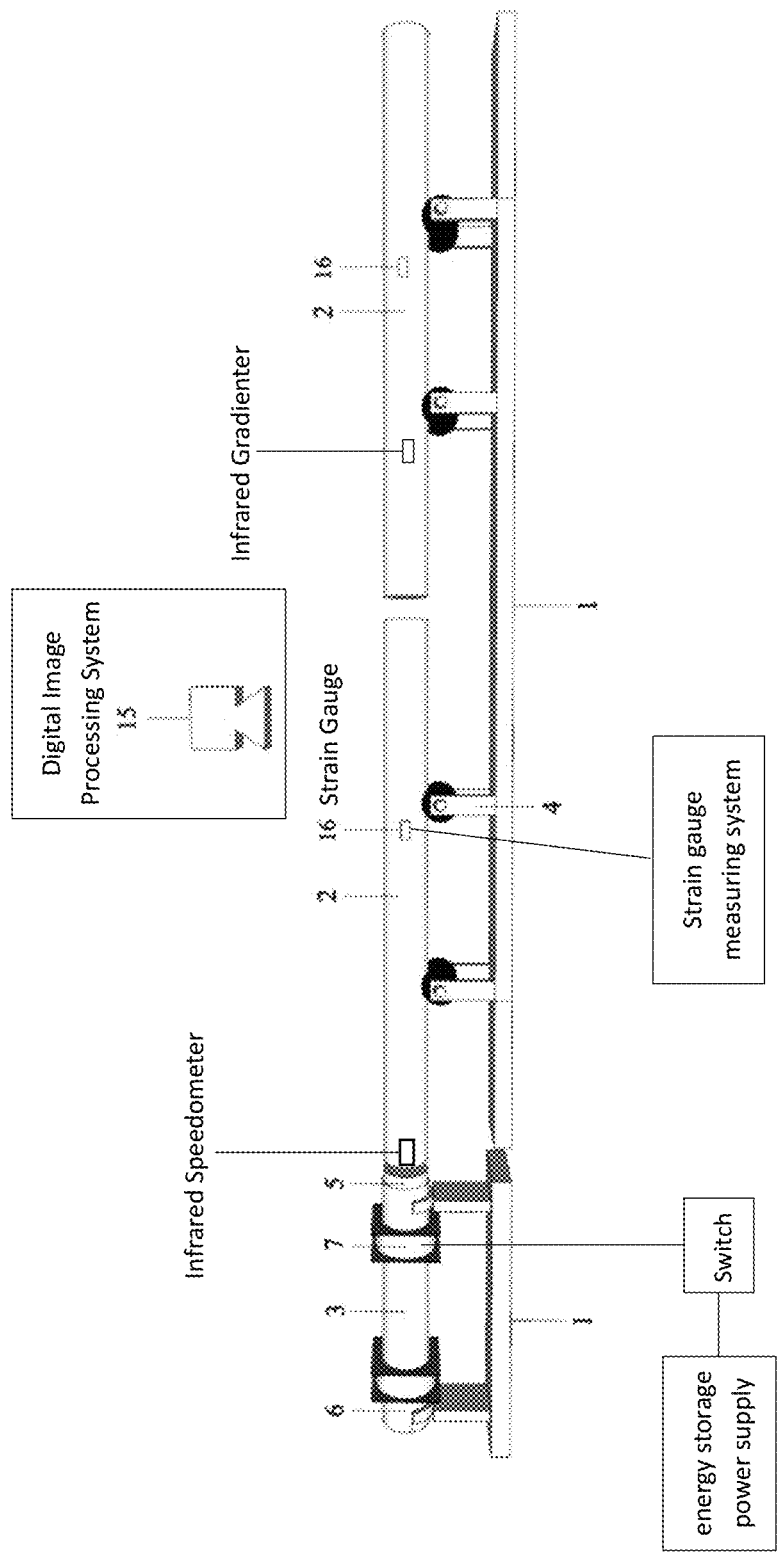
FIG. 1 is an elevation view of a test device used to study the propagation characteristics of elastic longitudinal waves at joint positions.
Figure 2:
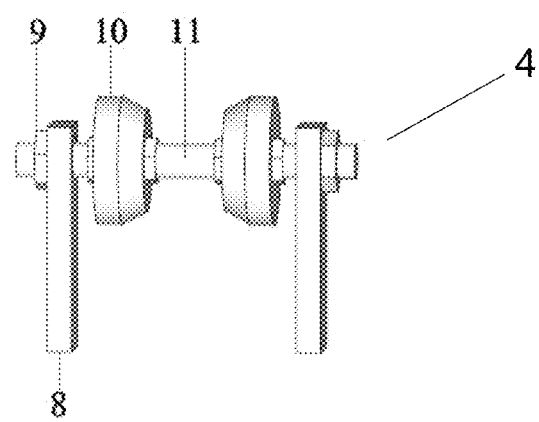
FIG. 2 is a detailed drawing of a supporter.
Figure 3:
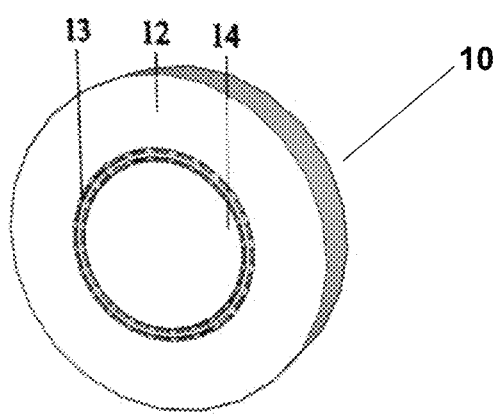
FIG. 3 is a detailed drawing of a pulley.

As shown in FIG. 1, an experimental device for studying the propagation characteristics of stress waves in jointed rock mass at high temperatures disclosed in the invention is used to measure the propagation characteristics of elastic longitudinal waves with different initial wave velocities and waveforms at joint positions under high temperature conditions.

The experimental device comprises a launch system 3, a loading system, a measuring system and a heating device. The launch system is used to fire the bullet, providing an initial waveform for rock sample 2. The loading system is mainly used to place rock sample 2, the measuring system is used to measure the strain in the middle of rock sample 2, and the heating device is used to heat rock sample 2. Rock sample 2 is a long bar. Launch system 3 includes a base 1, a bullet 5, a transmitting chamber 6, an infrared speedometer, and a drive coil 7. Transmitting chamber 6 is connected to base 1, and drive coil 7 twines outside the transmitting chamber 6. Bullet 5 is located inside the transmitting chamber 6, the bullet 5 contacts the inner surface of transmitting chamber 6 and is coated with lubricant. The infrared speedometer is located on the right side of transmitting chamber 6 for measuring the firing velocity of bullet 5.

The loading system includes a supporter 4 and an infrared gradienter. Supporter 4 includes a support rod 8, a fixing bolt 9, a pulley 10 and a screw 11. Screw 11 is connected to support rod 8 through fixing bolt 9. Meanwhile, pulley 10 is set on screw 11 and two fixing bolts 9 are placed on each side of pulley 10 to fix the pulley position. Pulley 10 includes outer pulley 12, bearing 13 and inner pulley 14. The outer pulley 12 and inner pulley 14 are connected by bearing 13, and they are connected with bearing 13 by welding. Fixing bolt 9 contacts the inner pulley 14, the inner pulley 14 and the outer pulley 12 being connected by bearing 13 to reduce the influence of friction on test results. Rock sample 2 is placed on pulley 10. During the test, the position of pulley 10 is moved by adjusting the position of fixing bolt 9, so as to adjust the position of rock sample 2. Infrared gradienter is used to ensure that the rock sample 2 is in a horizontal position.

The measuring system includes two sets of measuring systems, which are a strain gauge measuring system and a digital image processing measuring system. Strain gauge 16 of the strain gauge measuring system is attached to the outer surface of rock sample 2. The digital image processing measuring system has a high-speed camera 15, wherein a lens of the high-speed camera 15 is facing rock sample 2. The data obtained by the two measuring system are compared to ensure accuracy of the test.

Figure 4:
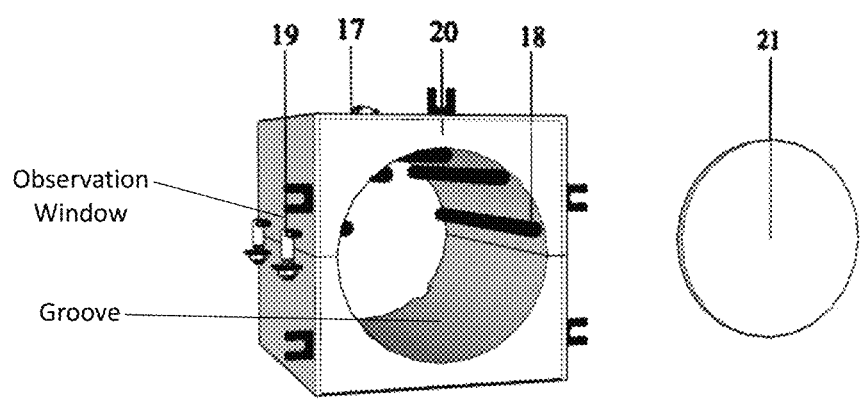
FIG. 4 is a detailed drawing of a heating device.

FIG. 4 is a detailed drawing of the heating device, it mainly includes metal shell 17, heating wire 18, connecting device 19, asbestos insulation layer 20, and asbestos sealing plate 21. Metal shell 17 is made of stainless steel, the asbestos insulation layer 20 is located inside metal shell 17 and is tightly connected to the metal shell 17, heating wire 18 is evenly distributed on the upper part of the heating device, and connecting device 19 is welded to the metal shell 17. The heating device is divided into two layers, which is convenient for installation during the test. The groove on the bottom of the heating device contacts support rod 8. Two heating devices are connected through connecting device 19 with full contact. The central part of the heating device has an observation window made of heat-resistant transparent material, through which the high-speed camera 15 photography is observed, and the heating device at both ends of rock sample 2 is sealed with asbestos sealing plate 21. A temperature sensor and an external control device is set within the heating device.

The material of base 1 is steel, so as to avoid the impact of shock on the test results. The shape of the metal projectile body can be cylindrical, conical, etc. Different shapes of the projectile body can be provided to obtain different initial waveforms. Transmitting chamber 6 is made of alumina ceramic material with high hardness insulation material. During the test, the switch is turned on to input a large pulse current to the drive coil. The current flows through the drive coil generating a strong pulse magnetic field to generate induction current in the armature. Since the current in the drive coil and the induced current in the armature are in opposite directions, they repel each other, which gives the bullet an initial acceleration that make it accelerate to the right. Through changing the discharge voltage, the initial velocity of the bullet is changed, and elastic longitudinal waves with different wave velocities are obtained. Drive coil 7 is connected to the energy storage power supply through a switch.

The invention adopts segmented heating, in which three heating devices are used to heat a rock rod in stages in the embodiment.

During the test, rock sample 2 with better machining accuracy is selected to be placed on pulley 10, and the position of pulley 10 is adjusted to ensure that rock sample 2 is fully contacting and coincident with another rock sample 2 and bullet 5. The heating device is installed, the heating device and heating time are set according to the test requirements, the high-speed camera 15 is set up and the strain gauge 16 is stuck to rock sample 2. The bullet 5 is pushed back to the top of transmitting chamber 6 and set the discharge voltage is set according to the test requirements. When the test temperature reaches the required level, the switch of launch system 3 turns on, bullet 5 fires and the test data is saved. When the test temperature is lower than 300° C., the strain gauge measuring system and digital image processing measuring system are adopted to measure the rock strain to ensure accuracy of the test results. When the test temperature is higher than 300° C., the digital image processing measuring system is better suited to solve this problem and meets the test requirements better than strain gauge 16.

What is claimed is:

1. A device for studying propagation characteristics of a stress wave in jointed rock mass at high temperature, which can be used to measure the propagation characteristics of elastic longitudinal waves with different initial wave velocities and waveforms at joints position under high temperature conditions, the device comprising a launch system, a loading system, a measuring system and a heating device, wherein:

the launch system is utilizable to fire a bullet at a rock sample, providing an initial waveform for the rock sample;

the loading system is utilizable to place the rock sample, the measuring system is used to measure a strain in the middle of the rock sample, and the heating device is used to heat the rock sample;

the rock sample is of a long bar shape;

the launch system comprises a base, the bullet, a transmitting chamber, an infrared speedometer, and a drive coil;

the transmitting chamber is connected to the base and to the drive coil twining outside the transmitting chamber, the bullet is located inside the transmitting chamber, the bullet contacts an inner surface of the transmitting chamber and is coated with lubricant;

the infrared speedometer is located on a side of the transmitting chamber for measuring firing velocity of the bullet;

the loading system comprises a supporter and an infrared gradienter, the supporter comprising a support rod, a fixing bolt, a pulley and a screw;

the screw is connected to the support rod through the fixing bolt;

the pulley is set on the screw and the fixing bolt is placed on each side of the pulley, respectively, to fix pulley position; the pulley comprises an outer pulley, a bearing and an inner pulley;

the outer pulley and the inner pulley are connected by the bearing, and the outer pulley and the inner pulley are connected with the bearing by welding;

the fixing bolt contacts with the inner pulley, the inner pulley and the outer pulley are connected by the bearing to reduce the influence of friction on test results;

the rock sample is placed on the pulley;

during a test, a position of the pulley is movable by adjusting a position of the fixing bolt, so as to adjust a position of the rock sample;

the infrared gradienter is utilizable to ensure that the rock sample is in a horizontal position;

the measuring system comprises two sets of measuring systems, which are a strain gauge measuring system and a digital image processing measuring system;

a strain gauge of the strain gauge measuring system is attached to an outer surface of the rock sample, the digital image processing measuring system has a high-speed camera, and a lens of the high-speed camera faces the rock sample;

data obtained by the two sets of measuring systems are comparable to ensure accuracy of the test;

the heating device comprises a metal shell, a heating wire, a connecting device, an asbestos insulation layer, and an asbestos sealing plate;

the metal shell is made of stainless steel, the asbestos insulation layer is located inside the metal shell and is tightly connected to the metal shell, the heating wire is evenly distributed on an upper part of the heating device, and the connecting device is welded to the metal shell;

the heating device is divided into two layers, which is convenient for installation during the test;

a groove on the bottom of the heating device contacts the support rod; and the two layers of the heating devices are connected through the connecting device with full contact.

2. The device for studying propagation characteristics of a stress wave in jointed rock mass at high temperature according to claim 1, wherein:

a central part of the heating device has an observation window made of heat-resistant transparent material, through which the high-speed camera photography is observed, the heating device at both ends of the rock sample is sealed with the asbestos sealing plate; and a temperature sensor and an external control device are set in an inner part of the heating device.

3. The device for studying propagation characteristics of a stress wave in jointed rock mass at high temperature according to claim 1, wherein:

a material of the base is steel, so as to avoid impact of shock on the test results; and a shape of metal projectile body is cylindrical or conical, which can provide different initial waveforms.

4. The device for studying propagation characteristics of a stress wave in jointed rock mass at high temperature according to claim 1, wherein the transmitting chamber is made of alumina ceramic material with high hardness insulation material.

5. The device for studying propagation characteristics of a stress wave in jointed rock mass at high temperature according to claim 1, wherein:

during the test, a switch can be turned on to input a pulse current to the drive coil, the pulse current flowing through the drive coil and generating a strong pulse magnetic field to generate induction current in an armature of the bullet, and since the pulse current in the drive coil and the induction current in the armature are in opposite directions they the drive coil and armature repel each other, which gives the bullet an initial acceleration that make the bullet accelerate;

through changing a discharge voltage, an initial velocity of the bullet is changed, elastic longitudinal waves with different wave velocities are obtained; and the drive coil is connected to an energy storage power supply through a power supply switch.

6. The device for studying propagation characteristics of a stress wave in jointed rock mass at high temperature according to claim 1, wherein during the test;

the rock sample with better machining accuracy is selectable to be placed on the pulley, adjust and the position of the pulley is adjustable to ensure that the rock sample fully contacts and is coincident with the bullet;

the heating device is installed according to test requirements, and the heating time is settable according to test requirements; and the bullet is pushed back to the top of the transmitting chamber and a discharge voltage is set according to the test requirements, and when the test temperature reaches a required level, a switch of the launch system is turned on firing the bullet and the test data is saved.

7. The device for studying propagation characteristics of a stress wave in jointed rock mass at high temperature according to claim 1, wherein:

when the test temperature is lower than 300° C., the strain gauge measuring system and the digital image processing measuring system are adoptable for measurement; and when the test temperature is higher than 300° C., the digital image processing measuring system is utilizable for measurement.

* * * * *